United States Patent [19]

Steury et al.

[11] Patent Number: 5,704,677
[45] Date of Patent: Jan. 6, 1998

[54] DRIVE ASSEMBLY FOR RETRACTABLE TOP OF A MOBILE HOUSING

[76] Inventors: Virgil H. Steury, 213 Egbert Rd.; Edwin J. Steury, 19623 Heritage Way, both of Goshen, Ind. 46526

[21] Appl. No.: 609,780

[22] Filed: Mar. 1, 1996

Related U.S. Application Data

[63] Continuation-in-part of Ser. No. 468,830, Jun. 6, 1995, abandoned.

[51] Int. Cl.$^6$ ........................................ B60P 3/34
[52] U.S. Cl. .................. 296/26; 296/171; 296/173; 296/175; 49/325; 74/89.22
[58] Field of Search ........................ 296/26, 171, 173, 296/175, 165; 49/325; 74/500.5, 89.2, 89.22

[56] References Cited

U.S. PATENT DOCUMENTS

| | | | |
|---|---|---|---|
| 3,508,782 | 4/1970 | Hostetler et al. | 296/27 |
| 3,674,305 | 7/1972 | Steury | 296/27 |
| 3,749,439 | 7/1973 | Ferguson | 296/26 |
| 3,981,529 | 9/1976 | Bontrager | 296/173 |
| 4,171,843 | 10/1979 | Steury | 296/27 |

*Primary Examiner*—Dennis H. Pedder
*Attorney, Agent, or Firm*—Trexler, Bushnell, Giangiorgi & Blackstone, Ltd.

[57] ABSTRACT

A mobile housing is provided with a plurality of telescopic standards mounted on a base for movably supporting the top of the mobile housing between a lowered position and a raised position relative to the base. A first pair and a second pair of slidable pistons are mounted in the base for simultaneous movement between a first position and a second position, the movement of each of the pair of pistons being substantially parallel and in opposite directions to one another. A first pair and a second pair of tubes, are provided with longitudinally extending slots and a flexible conduit extends from each of the tubes to one of the standards. Each of the tubes of the first pair and each of the tubes of the second pair are disposed in spaced parallel relationship to each other between the first and the second positions. A plurality of flexible, elongated, incompressible connector elements supported in the tubes and in the conduits are connected between the pair of pistons and respective ones of the standards for movement with the pistons in the tubes to prevent buckling and unnecessary flexing of the elements during raising and lowering of the top from the retracted position to the raised position. Drive means is coupled to each of the pair of pistons to effect simultaneous movement thereof between the first and the second positions. In a second embodiment, the tubes are replaced by a one-piece master tube in the form of an extrusion having separated guide channels for receiving the connector elements and preventing buckling or lateral movement of the connector elements. Snap on end caps are connected to the master tube and to the flexible conduits.

25 Claims, 4 Drawing Sheets

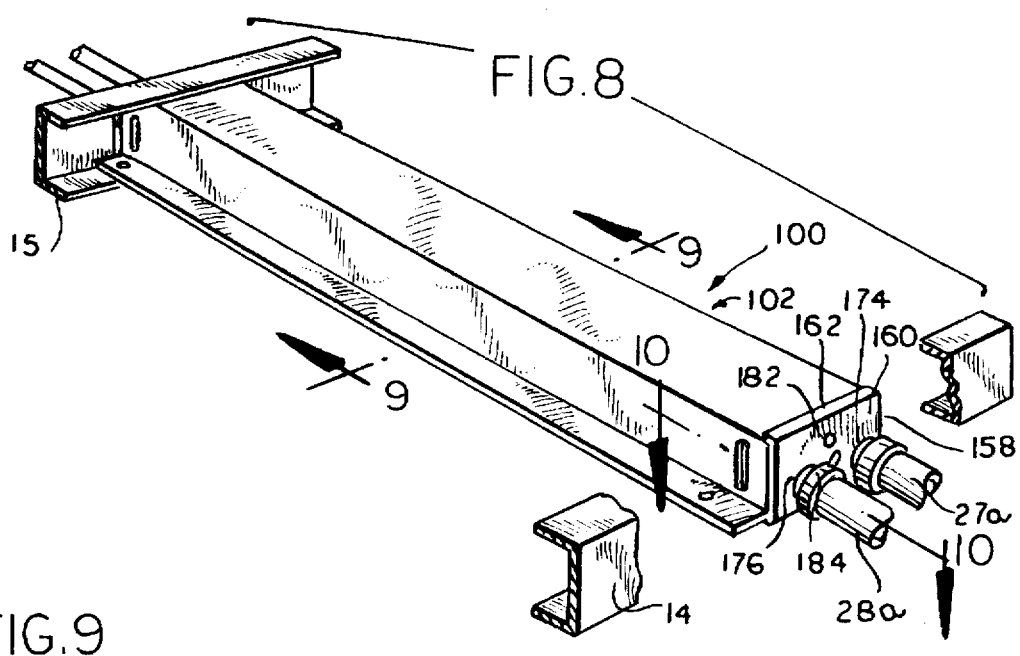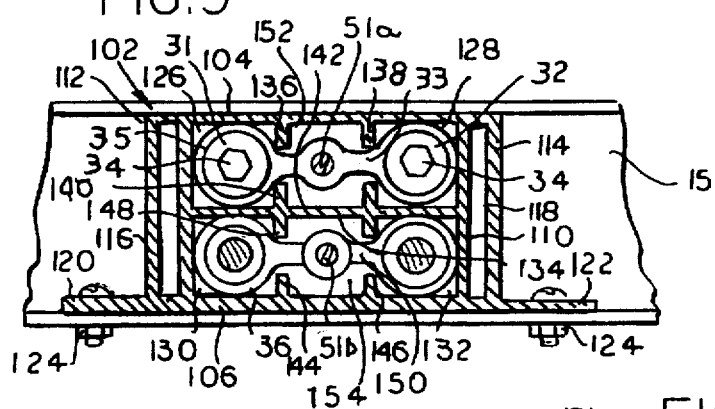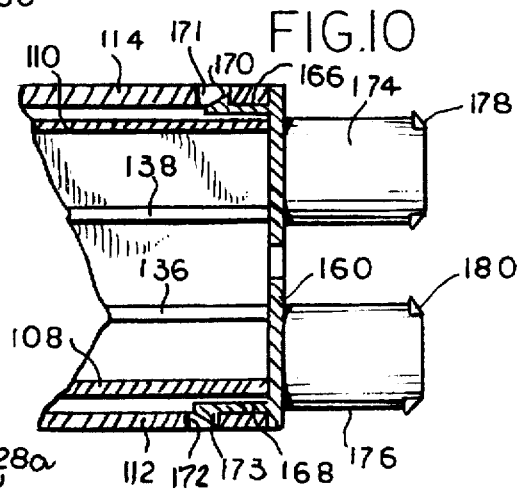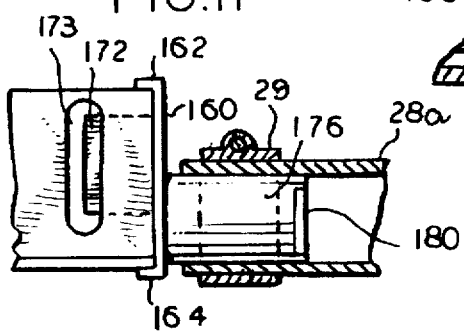

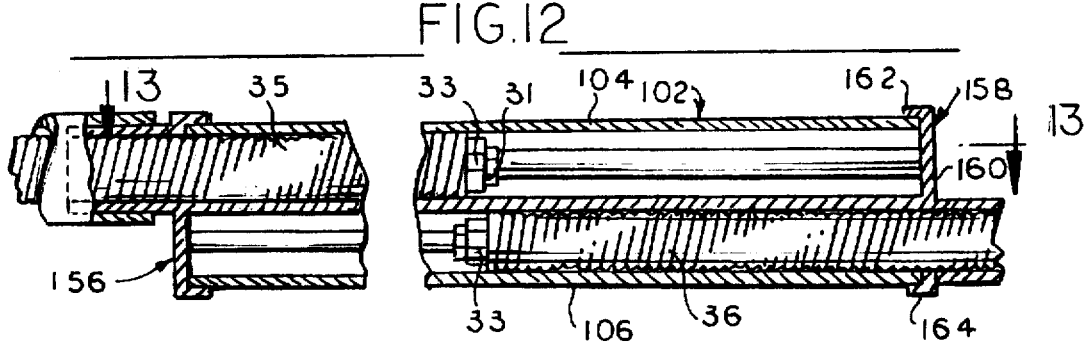
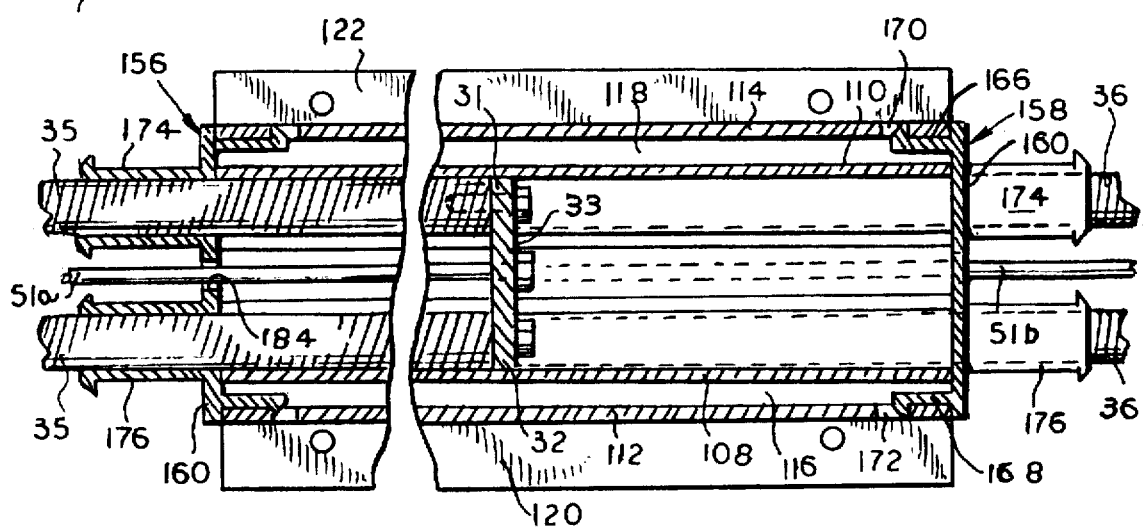
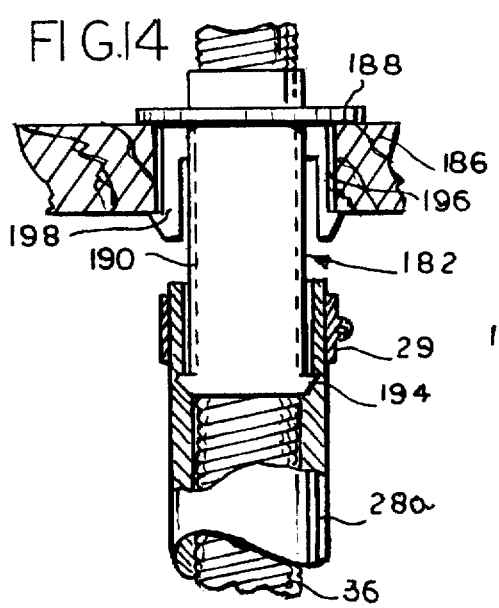
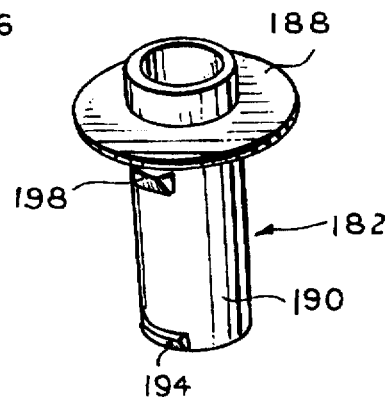

DRIVE ASSEMBLY FOR RETRACTABLE TOP OF A MOBILE HOUSING

This is a continuation-in-part of application Ser. No. 08/468,830 filed Jun. 6, 1995, now abandoned.

BACKGROUND OF THE INVENTION

The present invention relates generally to mobile housings such as trailers and campers, and more particularly to a mobile housing displaying a retractable top having an improved drive assembly for raising and lowering the top.

Mobile housings having retractable tops are well known in the art and include a plurality of elongated axially movable standards mounted to the base of the housing and supporting the top thereof for movement between a retracted or lowered position and an extended or raised position. Generally, the mobile housing employs a drive assembly comprising a plurality of connector elements for axially moving each of the standards to the extended position to raise the top relative to the base. Recent improvements to prior art drive assemblies, such as the assembly shown in Steury Pat. No. 4,171,843, issued on Oct. 23, 1979, provide simultaneous controlling of the height of the standards and such drive assemblies have been well accepted in the market, however, several disadvantages have become apparent.

It has been ascertained that after extended and continued use of the mobile housing and normal wear of the components of the drive assembly, the standards become unsynchronized with respect to each other and cause the top to raise in an uneven manner. As is readily apparent, such unsynchronized movement allows for the possibility of jamming or sticking of the drive assembly. Uneven movement of the top is caused by buckling or unnecessary flexing of the connector elements so that the top never reaches its maximum height. In addition, once the top is jammed in the raised position, it becomes quite difficult to move the top to the retracted position. It would, therefore, be desirable to provide an improved drive assembly wherein each of the connector elements is completely enclosed in a flexible conduit and in an elongated tube of rigid construction for preventing transverse movement of the portion of each of the connector elements supported between a pair of crossmembers of a frame supporting the base.

OBJECTS AND SUMMARY OF THE INVENTION

Accordingly, a general object of the present invention is to provide a new and improved drive assembly for simultaneously raising the top of a mobile housing, e.g., a camping trailer that is economical to manufacture and relatively simple in design.

Another object of the present invention is to provide a new and improved drive assembly for raising the top of a mobile housing in a more reliable manner than prior art assemblies.

A more specific object of the present invention is to provide a mobile housing utilizing a plurality of telescopically movable standards for raising the top thereof relative to the base with a new and improved drive assembly having novel guide tubes for controlling the standards in unison, thereby more evenly and reliably raising and lowering the top of the mobile housing.

Still another object of the present invention is to provide a new and improved drive assembly for moving the standards simultaneously to assure uniform movement thereof even after substantial and continued use of the mobile housing.

An additional object of the present invention is to provide an improved drive assembly which more reliably moves a plurality of standards equal distances more accurately and evenly positions the top of the mobile housing relative to the base.

A further object of the present invention is to provide a novel drive structure which may be relatively easily assembled and installed in a mobile housing or other trailer.

These and other objects and features of the invention will become more apparent from a reading of the following description. The aforementioned objects are achieved and the prior art deficiencies are eliminated by the utilization of a novel drive assembly for raising and lowering the top of a mobile housing, e.g., a camping trailer, having a plurality of axially and telescopically movable standards mounted on the base and supporting the top for movement between a lowered or retracted position when the mobile housing is in transit and an extended or raised position when the mobile housing is in use.

The drive assembly, in accordance with the present invention, comprises a plurality of guide means, in the form of rigid elongated tubes, and each of the tubes is provided with a longitudinally extending slot. A piston mounted in each of the tubes is supported for movement between a rearward position when the top is down and a forward position when the top is raised. A plurality of flexible but axially non-compressible and non-stretchable connector elements, one of the elements being for each of the standards, are rigidly connected at common ends of the pistons and extend into and terminate in the telescopic corner standards.

Each of the connector elements is guided initially to the respective standard through the rigid tube which, in addition, restricts the element to axial movement as opposed to a buckling, transverse or flexing type movement. In this manner, as the pistons are moved from the rearward to the forward position, which movement is provided by a winch assembly or other suitable means, the connector elements move axially forwardly into the respective corner-standards causing the standards to telescope upwardly and move the top of the housing from the retracted or lowered position to the extended or raised position. Since the connector elements move equal distances, i.e., equal to the movement of the pistons, and since the pistons are driven in unison, the top moves in a reliably uniform and level manner, such movement preventing jamming or sticking of the top. In addition, since all of the connector elements are driven by a single drive assembly, many gear arrangements are eliminated, which in turn minimizes the complexity of the assembly.

In an alternative embodiment, the rigid tubes are in the form of an elongated extruded member or master tube having separate internal channels or passageways which receive and guide the piston and end portions of the connector elements secured to the pistons.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which:

FIG. 8 is a view similar to FIG. 3, but shows an alternative embodiment of the present invention;

FIG. 9 is an enlarged sectional view taken along line 9—9 in FIG. 8;

FIG. 10 is an enlarged fragmentary partial sectional view taken along line 10—10 in FIG. 8;

FIG. 11 is a fragmentary partial sectional view of the portion of the structure shown in FIG. 10;

FIG. 12 is a sectional view taken along line 12—12 in FIG. 9;

FIG. 13 is a sectional view taken along line 13—13 in FIG. 12;

FIG. 14 is a fragmentary partial sectional view showing a fitting for connecting an end of a flexible guide conduit with the frame or floor of the trailer; and FIG. 15 is a perspective view of the fitting shown in FIG. 14.

DETAILED DESCRIPTION OF THE PREFERRED EMBODIMENT

Figure 1:
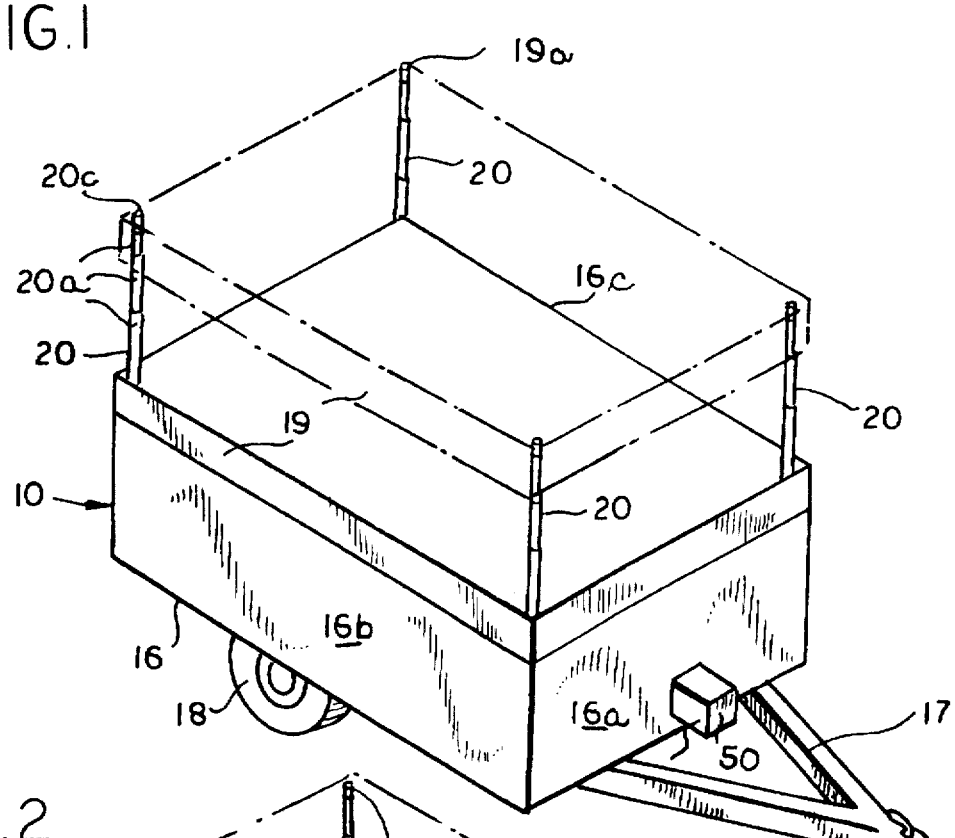
FIG. 1 is a view of a mobile housing employing the drive assembly of the present invention, the housing displaying a retractable top in both solid and dotted lines.

Turning now to the drawings wherein like components are designated by like reference numerals throughout the various figures of the drawings, a mobile housing frequently referred to as a camping trailer, constructed in accordance with the present invention, is illustrated in FIG. 1 of the drawings and is generally designated by the reference numeral 10. The mobile housing includes a frame 11 and a not-shown floor secured to the frame. The frame comprises a pair of side rails 11a and 11b, a front cross member 12, a rear cross member 13 and a pair of inner cross members 14 and 15. Mounted to the frame 11 is a base 16 including a front wall 16a and a pair of side walls 16b and 16c having a not-shown door generally in the rear or in one of the side walls thereof for entry therein. A hitch assembly 17 connected to and extending forwardly of the frame 11 is provided for connecting the mobile housing to a not-shown vehicle for transport thereof. The frame 11 is supported for transportation on a pair of laterally spaced wheels 18 secured to the frame 11.

Figure 2:
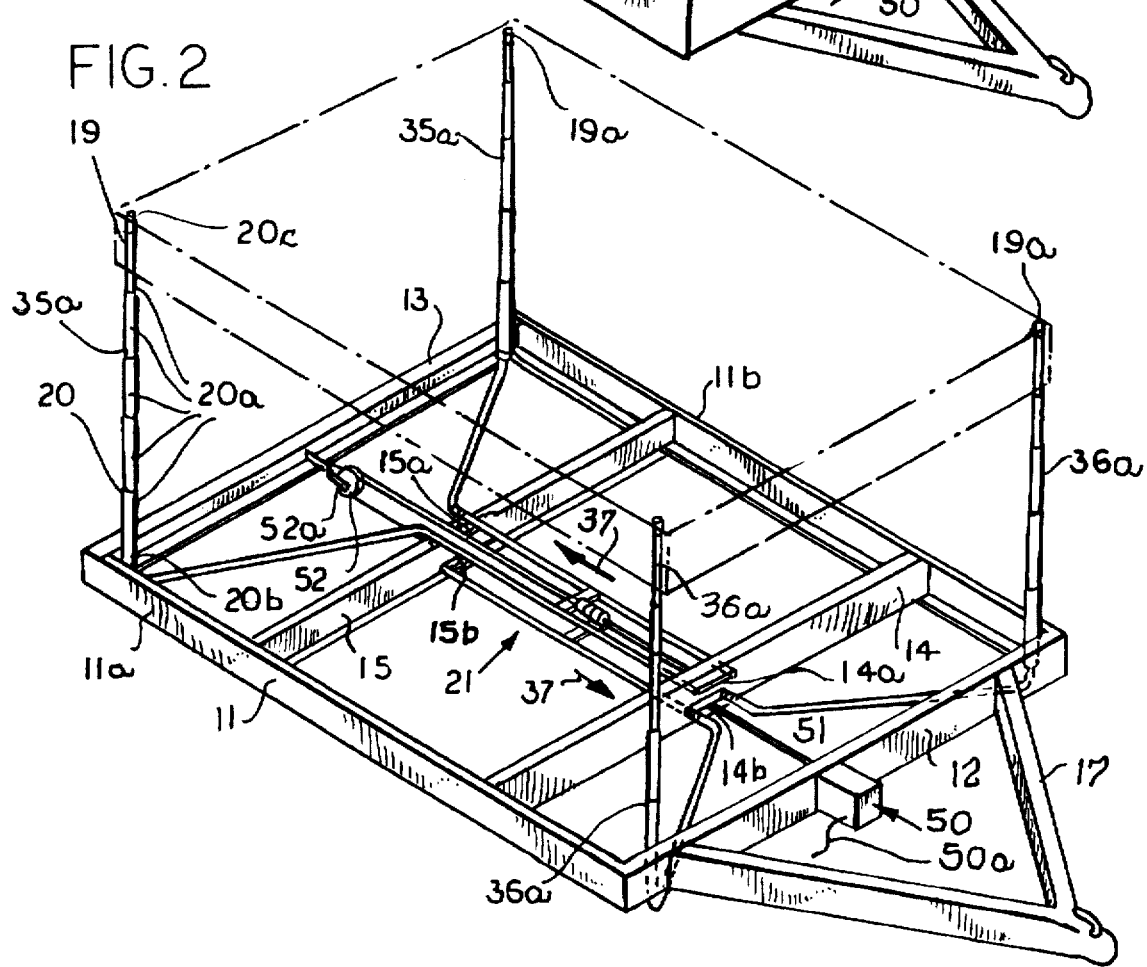
FIG. 2 is a diagrammatic view of the housing frame, four corner-standards and a drive assembly employed for raising and lowering the retractable top of the mobile housing of FIG. 1 of the drawings.

The housing 10 further includes a substantially rectangular top 19 supported by four elongated telescopically and axially movable hollow standards 20, generally of circular or square cross-section, for movement between a retracted or lowered position relative to the base 16, and an extended or raised position, as illustrated by the dotted lines. As shown in FIG. 2 of the drawings, each of the standards 20 includes a plurality of concentric telescopic sections 20a defining an axial passageway 20b extending through the entire corner-standards and terminating at the top closed end 20c of the innermost concentric telescopic section. Each of the standards is mounted to and through the not-shown floor at or near the corners of the base, and extends vertically upwardly into a cooperating socket 19a provided in the corners of the top 19. In this manner, as the standards are driven from the telescopically retracted positions to the extended positions, the top 19 is lifted from the retracted or lowered position to the extended or raised position. While four corner-standards are shown, it is to be understood that the invention herein disclosed and claimed contemplates any number of such standards, depending upon the size and shape of the mobile housing 10.

Figure 3:
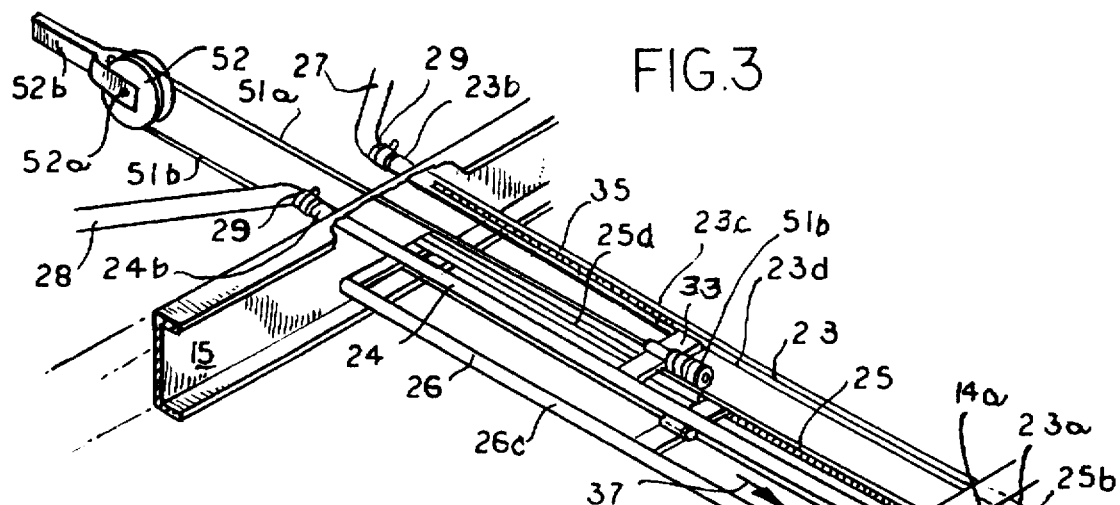
FIG. 3 is a diagrammatic fragmentary section of the drive assembly shown in FIG. 2 of the drawings.

In order to extend the standards 20 from the retracted to the extended positions and thereby raise the top 19, a central drive means or drive assembly 21 and a guide means or actuator structure, constructed in accordance with the present invention and best illustrated in FIG. 3 of the drawings, is provided. The guide means or actuator structure includes a pair of rigid, elongated upper tubes 23 and 24 and a pair of rigid, elongated lower tubes 25 and 26, and each of the tubes is provided with longitudinal slots 23d, 24d, 25d and 26d. As best illustrated in FIG. 3 of the drawings, additional guide means in the form of a pair of upper flexible conduits 27 and 28 are disposed rearwardly of the guide means and a pair of lower flexible conduits 27a and 28b are disposed forwardly of the guide means. The conduits are made of suitable plastic material reinforced with woven threads. Each of the inner ends of the conduits 27, 28, 27a and 28b, fits over each of the rear end portions 23b, 24b, 25b and 26b of the tubes and a clamp 29 secures each of the conduits to one of the tubes. The clamps 29 also restrict and limit movement of the tubes when the drive assembly is employed for lowering the top 19 of the mobile housing.

Figure 4:
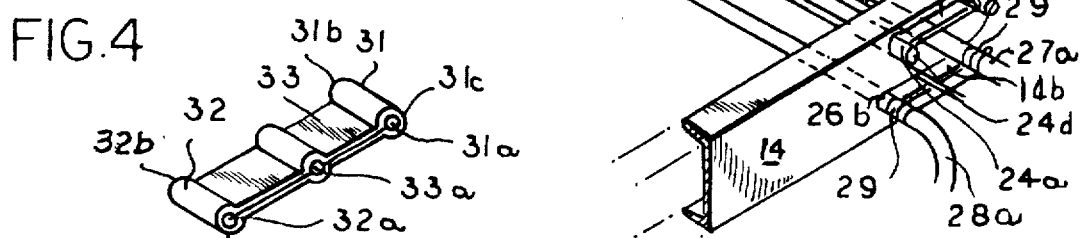
FIG. 4 is an isometric view of a pair of pistons integrally connected to a cross arm.
Figure 5:
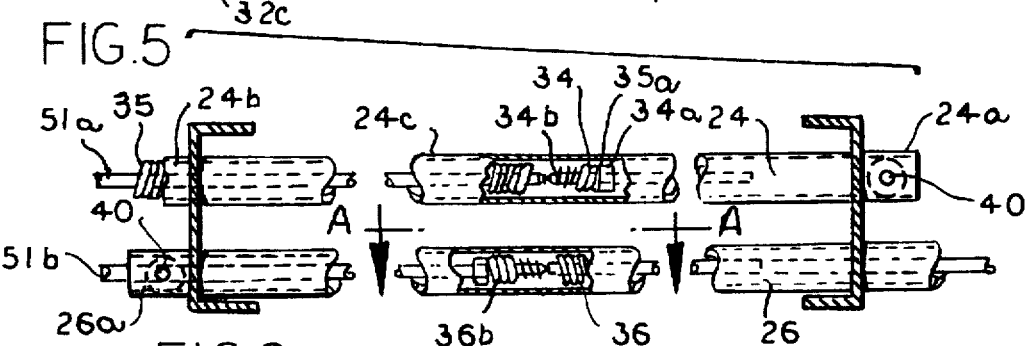
FIG. 5 is an enlarged fragmentary side view of the drive assembly shown in FIG. 3 of the drawings.

In accordance with the present invention, and as shown in FIGS. 3 and 5–7 of the drawings, the drive assembly 21 comprises a plurality of pistons 31 and 32 of cylindrical configuration and dimensioned to move snugly and slidably within the tubes. The guide means or tubes, of course, can be positioned transverse of the frame 11 or in any other position relative thereto, depending upon the size and shape of the mobile housing. It should be understood that the invention herein disclosed and claimed is not limited to circular shaped tubes and pistons, but rather contemplates any reasonable shape thereof, so long as proper operation is maintained. The pistons 31 and 32, as best shown in FIG. 4 of the drawings, are connected together with a cross arm 33 having a thickness substantially equal to the width of the longitudinal slot provided in each of the tubes. Further, the slots in the tubes 23 and 24 must be in allochiral relationship or in registry with the cross arm, e.g., if the pistons depend from the cross arm, the slots must face upwardly (or downwardly) to receive the pistons. The central portion of the cross arm 33 is provided with a hole 33a. Each of the pistons is also provided with an aperture 31a and 32a for receiving a threaded bolt 34.

As best shown in FIG. 3 of the drawings, four laterally spaced flexible connector elements 35 and 36 are mounted at common ends at the front faces 31b and 32b of the pistons 31 and 32, in a manner well known in the art. As illustrated, the connector elements are highly convoluted or coiled springs thereby exhibiting substantially no compression or expansion in the axial direction which is otherwise typical of springs displaying a lesser number of convolutions per unit length. Each of the elements 35 and 36 is rigidly mounted to each of the faces 31b and 32b of the pistons 31 and 32 with one of the threaded bolts 34, headed at one end 34a, and extending inwardly from the front face 31c and 32c of each of the pistons through each of the apertures 31a and 32a, and then extending a substantial distance beyond the front faces 31b and 32b where the bolts 34 are rigidly threaded into the ends 35b and 36b of the elements. Rigid securement of the pistons to the elements is obtained because the cross-sectional diameter of the threaded portion 34b of the bolt 34 is slightly greater than the inner cross-sectional diameter of each of the connector elements 35 and 36, and the threads on the bolt have the same pitch as the convolutions of the elements.

Figure 6:
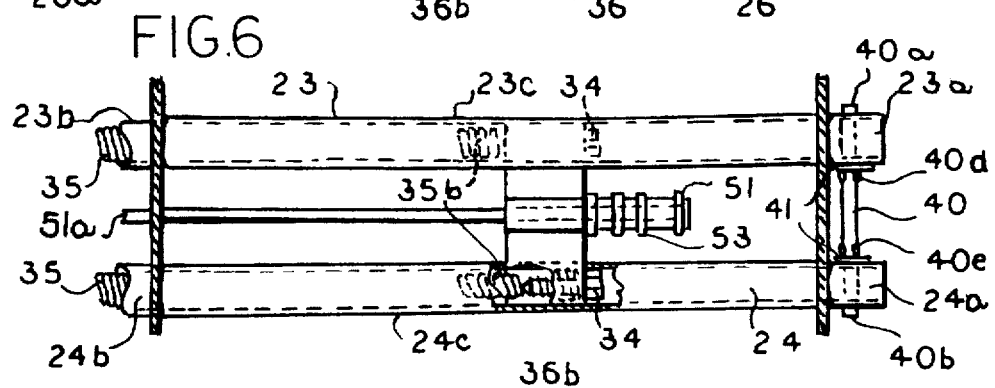
FIG. 6 is an enlarged fragmentary top view of the upper portion of the drive assembly shown in FIG. 3 of the drawings.
Figure 7:
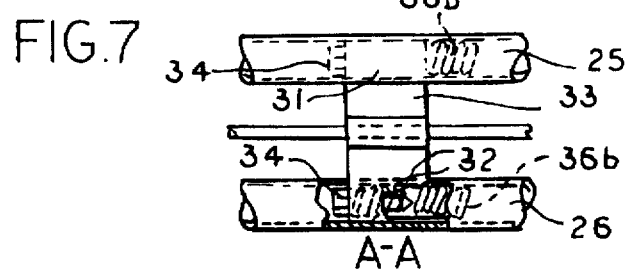
FIG. 7 is an enlarged fragmentary top view of the lower portion of the drive assembly shown in FIG. 3 of the drawings.

It should be understood, of course, that the invention herein disclosed and claimed is not limited to the spring-type connector elements, as illustrated, but can be of any form so long as the elements perform the operation described below. In addition, the elements can be rigidly mounted to the piston by welding or any other suitable methods. Further, as shown in the drawings, inasmuch as each of the pair of pistons with the integral cross arm and the connector elements disposed in the upper and lower pairs of tubes are identical, the same reference numerals are used in the drawings. The elements 35 and 36 extend outwardly from the ends 23b, 24b, 25b and 26b, of the tubes 23, 24, 25 and 26 and the elements then pass through the conduits 27, 28, 27a and 28a. Preferably and as best illustrated in FIGS. 3 and 6 of the drawings, the front end portions of each of the tubes is secured or otherwise suitably fastened to the cross members 14 and 15 with a securing means 40. In accordance with the present invention, the securing means 40 comprises a rod having end portions 40a, 40b extending through holes provided in the front end portions 23a, 24a, 25a and 26a of the tubes and a center portion 40c. To maintain the tubes in spaced parallel relationship and restrict lateral movement of the tubes, swaged portions 40d and 40e are formed on the rod and a pair of washers 41 are disposed outwardly of the swaged portions 40d and 40e, further to prevent lateral movement of the front end portions of the tubes. The upper pair of tubes are received in a pair of slots 14a and 15a respectively provided in the cross member 14 and the cross member 15 and the vertical sides of the slots 14a and 15a limit outward movement of the upper pair of tubes 23, 24. Similar slots 14b and 15b respectively provided in the cross member 14 and in the cross member 15 limit outward movement of the lower pair of tubes 25 and 26. As best shown in FIG. 3 of the drawings, the elongated slot provided in each of the tubes receives the cross arm 33 connecting the pair of pistons together.

Preferably, the conduits 27, 28, 27a and 28a extend from the rear end portions 23b, 24b, 25b and 26b of the tubes 23, 24, 25 and 26 to the associated corner-standard 20 where the conduits terminate a slight distance within the passageway 20b, defined by the various telescopic sections 20a. In this manner, each of the connector elements 35 and 36 is guided through the associated conduit and into the passageway 20b, where each of the elements terminates in engagement with the top end 20c of the innermost telescopic section 20a, causing the distal end of each of the connector elements to engage against the top end 20c of the innermost telescopic section 20a (see FIG. 2 of the drawings). The individual conduits can take any convenient route or path to the associated corner-standard. It should be noted that, in addition to providing means for guiding the connector elements, the conduits also restrict the connector elements to axial movement as opposed to buckling or flexing type movement.

As best shown in FIGS. 2 and 3 of the drawings, it is readily apparent that by axially moving the connector elements in the direction indicated by arrow 37, the forward or entering ends of the connector elements engage against the top end 20c of the innermost telescopic section 20a, causing the corner-standard to move from the retracted or lowered position to an extended or raised position. It is likewise apparent that by axially moving all four connector elements in unison, all four corner-standards simultaneously rise to the extended position, causing the top 19 of the mobile housing 10 to move from the retracted or lowered position to the extended or raised position.

In order to achieve the aforementioned simultaneous axial movement of all four of the connector elements, a winch assembly 50 is provided for moving the upper and lower pair of pistons 31 and 32 from the rearward position, as seen best in FIG. 3, to the forward position. Accordingly, the connector elements, being rigidly connected to the pistons, are forced into and raise the corner-standards. Since the tubes 23, 24, 25 and 26 prevent buckling or flexing of the connector elements, uniform movement of the elements is reliably maintained. In this regard, it should be noted that the tubes are sufficiently rigid to prevent buckling or flexing of the elements in the tubes. In addition, since the tubes are straight, and since the elements shift or move axially in a straight direction therein, buckling or flexing is substantially eliminated.

As best seen in FIGS. 2 and 3 of the drawings, the winch assembly 50 includes a not-shown reel and a cord or steel cable 51 fastened at one end to the reel. The cable includes an intermediate portion secured or crimped in the hole 33a of the lower cross arm 33, a center portion extending around a pulley 52 and the upper portion 51a is received in the hole 33a of the upper cross arm. The pulley 52 is supported on a shaft 52a secured to a bifurcated arm 52b. As shown in FIG. 3 of the drawings, the upper free end of the cable 51 is provided with a crimp 51b, or other suitable means, for rigidly fastening the upper portion 51a of the cable 51 and the upper cross arm 33 together. In this manner, cranking of the winch assembly in one direction causes the lower pair of pistons to move from the rearward position to the forward position and the upper pair of pistons to move in the opposite direction. The pistons shown in the drawings are centrally located between the inner cross members 14 and 15 only for convenience. Actually, when the top 19 is in the retracted position, the upper pair of pistons, with respect to the mobile housing, are disposed in the forward position and the lower pair of pistons are disposed in the rear position. Generally the winch assembly 50 is driven manually by a crank 50a.

It should be noted that the top 19 of the mobile housing 10 is of sufficient weight to drive or move the corner-standards 20 from the extended positions to the retracted positions when the top is in the raised position. This, of course, causes the elements to move back into the rigid tubes, causing the pistons 31 and 32 to move back to the first position. To prevent accidental movement of the top 19, the winch is locked in the raised position, thereby maintaining the pistons locked in the second position. This is achieved by the utilization of a not-shown pawl that is spring mounted to the winch assembly 50 for preventing the reel from rotating in the opposite direction, while simultaneously allowing the reel to move in one direction. In this manner, the pistons can be fixed in the second position, thereby prohibiting axial movement of the elements 35 and 36, and preventing the weight of the top 19 from driving the corner-standards 20 from the extended to the retracted positions.

With the mobile housing 10 constructed in the aforementioned manner, attention is now directed to the manner in which the top 19 is raised from the initial retracted or lower position. This is achieved by driving the reel in one direction causing the pistons 31 and 32 to move from the first position to the second position, which simultaneously causes all four of the elements to axially move in unison equal distances through their associated tubes for driving the corner-standards 20 from their retracted positions to their extended positions. Because the elements are axially driven equal distances, the four corner-standards are maintained level with respect to each other, thereby assuring that the top 19 remains level. Once the top 19 is in the raised position, the top can be kept at such position. The lowering operation is accomplished merely by disengaging the pawl on the winch and allowing the top to move gravitationally back to its retracted position.

Referring now to FIGS. 8–15, there is shown an alternative embodiment of the present invention. Elements of this embodiment which correspond to those described above are designated by the same reference numerals and need not be described in detail. In this embodiment, the previously described guide or actuator means 22 has been replaced by a master guide tube structure 100 which has the same function and simplifies the manufacture and installation of the mechanism. More specifically, the master tube 100 comprises an elongated tubular extrusion 102, preferably economically produced from a strong wear-resistant plastic material. While various materials may be used, it has been found that a rigid polyvinyl chloride material is satisfactory.

The master tube 102 is extruded with opposed top and bottom walls 104 and 106 and opposite inner side walls 108 and 110. In addition, outer side walls 112 and 114 are offset from the inner side walls so as to define spaces 116 and 118 for the purpose to be described below. Lateral flanges 120 and 122 extend oppositely from the bottom wall 106 for receiving screws 124 or bolts or other suitable fasteners used to secure the master tube 102 to the frame members 14 and 15.

The interior of the master tube 102 is divided so as to provide rigid guide tubes or channels 126, 128, 130 and 132 for slidably receiving end portions of the connector elements 35 and 36. The dimensions of the guide tubes 126–132 are such as to prevent buckling or lateral bending or movement of the connector elements so as to assure equal operation of the elements 35 and 36.

An intermediate horizontal wall 134 extends between the opposite side walls 108 and 110. Opposite end portions of the wall 134 combine with adjacent portions of the top wall 104 and opposite side walls 108 and 110 to define three sides of the tubes or channels 126 and 128. Inner sides of the channels 126 and 128 are defined by spaced apart walls 136 and 138 having longitudinal slots 140 and 142 therein to provide clearance for the cross members 33 between the pistons 31 and 32. The remaining channels or tubes 130 and 132 are similarly defined by opposite end portions of the bottom wall 106, the intermediate wall or divider 134 and opposite side walls 108 and 110. Additional spaced apart inner walls 144 and 146 complete the enclosure of the tubes or channels 130 and 132. The walls 144 and 146 are respectively formed with slots 148 and 150 to provide clearance for the cross member 33. The spaced apart walls 136 and 138 define an upper middle channel 152 and the walls 144 and 146 similarly define a lower middle channel or tube 154. The channels 152 and 154 respectively serve to enclose upper and lower runs 51a and 51b of the actuating cable 51.

From the foregoing, it is seen that the combined channels or tubes 126, 128, 130 and 132 may be easily and economically produced by a known extrusion process. In order to complete the master tube structure and to effectively exclude dirt and the like from the interior thereof, end caps 156 and 158 are fitted to opposite ends of the tube 102. The end caps are molded from a suitable plastic material such as nylon or polypropylene and are adapted to be snap fitted with the tube 102. The end caps 156 and 158 are identical so that the same reference numerals will be applied to identical parts. Referring specifically to end cap 158 shown in FIGS. 8, 10, 12 and 13, it is seen that the cap comprises a base or end wall having dimensions and a configuration for completely covering an end of the tube 102. Upper and lower flanges 162 and 164 projecting laterally from upper and lower margins of the end wall or base 160 embrace the upper and lower walls 104 and 106 of the tube 102.

In order to connect the end cap to the tube 102, flexible tongues or fingers 166 and 168 project from opposite side margins of the end wall or base 160. These fingers are adapted to extend into ends of the spaces 118 and 116 between the tube walls 110, 114 and 108, 112 respectively. The fingers 166 and 168 are respectively formed with barbs 170 and 172 adapted to snap into slots 171 and 173 cut out of the outer side walls 114 and 112 of the tube 102. It is thus seen that the end caps may be quickly and easily assembled with the tube without requiring any special tools or fasteners.

The end cap 158 further includes tubular nipples or fittings 174 and 176 which are preferably integrally formed with the end wall or base 160 and extend outwardly therefrom. The tubular elements 174 and 176 are respectively aligned with and provide extensions of the channels or tubes 132 and 130 for guiding the connectors 36. The nipples are adapted to extend into and to be connected to the hoses 27a and 28a as shown in FIGS. 8 and 11. In order to make the connection secure, the nipples are formed with shoulders or barbs 178 and 180 at their outer ends and hose clamps 29 are used.

As shown in FIG. 8, the end wall or base 160 of the cap is provided with upper and lower aperture means 182 and 184 for accommodating the actuating cable 51. The aperture means 182 has a knock out plug which can be selectively removed. As mentioned above, the end caps at the opposite ends of the tube 102 are identical. Thus, when the cap is to be installed at the right hand end of the tube 102, as viewed in FIG. 8, the knock out plug is retained in the upper aperture means 182 since only the aperture 184 need be open to accommodate the lower run 51b of the cable. When the cap is installed at the left hand end of the tube 102, as viewed in FIG. 8, the knock out plug is removed from the aperture means 182 to allow for the passage of the upper run 51a of the actuating cable.

In order to facilitate installation of the drive assembly in a trailer or the like, a fitting 182, as shown in FIGS. 14 and 15, is provided at each corner of the trailer in alignment with the respective telescopic standards or jacks 20. More specifically, each fitting 182 is mounted in a hole 184 formed in a frame or floor member 186 of the trailer as shown in FIG. 14. The fitting 182 has an enlarged head 188 adapted to overlie the floor 186 and a tubular body or shank 190 extending axially from the annular head through the hole 184. An end of one of the guide tubes or hoses 27, 27a, 28 or 28a is slipped over the tubular shank 190 and secured in place by a hose clamp 29. Barbs 194 are formed at the end of the shank 190 to aid in securing the hose. Each fitting 182 is provided with integral means for fastening it to the member 186. As shown in FIG. 14, flexible fingers 196 and 198 extend axially from the head 188 in slightly spaced relationship with respect to the shank for insertion through the hole 184. The fingers 196 and 198 are formed with laterally outwardly projecting shoulders or barbs 200 and 202 for snapping beneath the member 186 and thus cooperating with the head in securing the fitting in place. Preferably, the fitting 182 is molded in one piece from a suitable tough, wear resistant, flexible plastic such as polypropylene.

It is apparent that the drive assembly of FIGS. 8–15 may be quickly and easily installed. After the connector elements 35 and 36 and the actuator cable 51 are threaded through the tube 102, the end caps 156 and 158 may be applied over the connector and actuator elements and snapped onto the opposite ends of the tube 102. The flexible hoses 27 and 28 may be assembled over the connector elements and secured to the end caps either before or after the end caps are snapped onto the ends of the tube 102. It is noted that this much of the assembly can be done either before or after the tube 102 is fixed to the trailer by the screws or bolts 124. The connector elements 35 and 36 are then threaded through the fittings 182 which have been secured to the trailer and the hoses are clamped onto the shanks 190.

While there have been shown and described particular embodiments of the present invention, it will be apparent to those skilled in the art that various modifications of the present invention can be made without departing from the invention in its broader aspects, and it is therefore aimed in the appended claims to cover all such changes and modifications which fall within the true spirit and scope of the present invention.

The invention claimed is:

1. A mobile housing comprising: a base having four corners, a top, a plurality of telescopic standards mounted at the corners of the base for supporting the top between a lowered position and a raised position relative to the base, a first and a second pair of pistons supported on the base for movement between a first position and a second position, a plurality of flexible elongated incompressible connector elements, one end of each of the connector elements being rigidly secured to one of the pistons, the other end of each of the connector elements being respectively disposed in the standards at the inner portion thereof for moving the top from the lowered position to the raised position in response to simultaneous movement of the pistons from the first position to the second position, drive means for simultaneously moving the pistons from the first position to the second position, the drive means including a winch, a cable having a first end secured to the first of the pair of pistons, an intermediate portion of the cable secured to the second of the pair of pistons, and a second end of the cable secured to the winch, a pulley secured to the base for receiving the cable therethrough at a portion of the cable between the intermediate portion and the first end, a first and a second pair of tubes secured to the base, the first pair of pistons being disposed in the first pair of tubes, the second pair of pistons being disposed in the second pair of tubes, each of the pair of pistons being slidable linearly in the tubes in opposite directions upon actuation of the winch for moving the top from a lowered position to a raised position.

2. A mobile housing having a base, a top, a pair of telescopic standards secured to the base, a drive assembly mounted to the base, a pair of flexible, elongated connector elements, each of the elements having a front portion disposed in each of the standards and a rear portion interconnecting each of the standards to the drive assembly, and a pair of conduits having a forward end and a distal end, each of the conduits enclosing the elements, the drive assembly comprising:

a pair of tubes secured to the conduits, means for maintaining the tubes in spaced parallel relationship to each other, each of the tubes having a first portion, an intermediate portion and a second portion, the first and second portions of each of the tubes being supported by the base, each of the tubes being provided with a longitudinal slot extending between the first portion and the second portion, securing means attached to the rear portions of the flexible connector elements disposed in the tubes, drive means connected to the securing means for moving the securing means between the first and the second portions of the tubes whereby movement of the securing means in one direction with the drive means pushes the front portions of the connector elements into the telescopic standards and raises the top with respect to the base and movement of the drive means in the other direction with the drive assembly lowers the top with respect to the base.

3. A mobile housing having a base, a top, a pair of telescopic standards secured to the base, a drive assembly mounted to the base, a pair of flexible elongated connector elements, each of the elements having a front portion disposed in each of the standards and a rear portion interconnecting each of the standards to the drive assembly, and a pair of conduits having a forward end and a distal end, each of the conduits enclosing the elements, the drive assembly comprising:

a pair of tubes secured to the conduits, means for maintaining the tubes in spaced parallel relationship to each other, each of the tubes having a first portion, an intermediate portion and a second portion, the first and second portions of each of the tubes being supported by the base, each of the tubes being provided with a longitudinal slot extending between the first portion and the second portion, the longitudinal slots provided in the tubes being in allochiral relationship, a pair of slidable pistons, one of the pistons being secured to a rear portion of the flexible connector elements supported in one of the tubes, the other of the pistons being supported in the other of the tubes, a cross arm connecting the pistons to each other, drive means connected to the cross arm for moving the pistons between the first and the second portions of the tubes, whereby movement of the pistons in one direction with the drive means pushes the front portions of the connector elements into the telescopic standards and raises the top with respect to the base and movement of the pistons in the other direction with the drive means lowers the top with respect to the base.

4. The mobile housing of claim 3, wherein the tubes are rigid and the conduits are flexible, and the distal end of each of the conduits extends to each of the standards.

5. The mobile housing of claim 4, wherein the pair of pistons and the cross arm are one piece, each of the pistons are provided with an aperture, a fastening means disposed in each of the tubes extends into each of the apertures and secures the piston to the rear portion of the connector element.

6. The mobile housing of claim 2, wherein the base comprises a pair of spaced cross-members, the first and second portions of the tubes are supported by the cross-members, and a securing means connects the first portions of the tubes together in spaced relationship.

7. The mobile housing of claim 6, wherein the cross members are provided with elongated slots, the tubes are disposed in the slots, and the slots limit outward transverse movement of the first portion of the tubes.

8. The mobile housing of claim 6, wherein the securing means comprises an elongated rod having a pair of end portions and a center portion, the first portion of each of the tubes is provided with an opening of the same cross-section as the rod, the end portions of the rod are secured to the first portions of the tubes, the center portion of the rod is provided with a pair of spaced non-circular sections for maintaining the first portions of the tubes in spaced relationship.

9. The mobile housing of claim 8, wherein the noncircular portions of the rod are swaged and the cross-members limit outward transverse movement of the first portions of the tubes.

10. A lift for a plurality of telescopic standards mounted on a base comprising an actuator, a plurality of elongated incompressible connector elements extending from said actuator for actuating said standards, guide means surrounding said connector elements and extending from said actuator to said standards, said actuator including an axially movable piston extending between and connected with laterally spaced apart portions of said connector elements which extend from said guide means, a guide structure including separate tubes respectively confining said connector element portions against buckling and providing clearance for said piston, and means for axially moving said piston to axially move said connector elements in unison for operating said standards.

11. A lift as defined in claim 10, wherein said tubes comprise spaced apart rigid tubes having slots in sides thereof providing said clearance for said piston.

12. A lift for a plurality of telescopic standards mounted on a base comprising an actuator, a plurality of elongated incompressible connector elements extending from said actuator for actuating said standards, guide means surrounding said connector elements and extending from said actuator to said standards, said actuator including an axially moveable piston extending between and connected with laterally spaced-apart portions of said connector elements which extend from said guide means, a guide structure confining said connector element portions against buckling and providing clearance for said piston, and means for axially moving said piston to axially move said connector elements in unison for operating said standards, said confining structure comprising an elongated tubular member having opposed sides respectively confining first sides of said connector element portions, internal spaced apart walls respectively confining opposite sides of said laterally spaced apart connector element portions, said internal walls having longitudinal slots therein defining said clearance for said piston.

13. A lift as defined in claim 12, wherein said tubular member is extruded in one piece.

14. A lift as defined in claim 12, which includes a cap covering an end of said tubular member and interengaging means on said tubular member and said cap for securing said cap to the tubular member.

15. A lift as defined in claim 14, wherein said interengaging means comprises a flexible finger on said cap, a slot in a side wall of said tubular member, and a shoulder on said flexible finger adapted to be snapped into said slot.

16. A lift as defined in claim 14, wherein said cap includes tubular nipples through which said connector elements extend, said guide means comprising hoses respectively connected to said nipples.

17. A lift as defined in claim 16, fittings mounted in holes in members adjacent standards to be actuated, each of said fittings comprising an enlarged head portion for engaging one side of said last named member and a tubular shank extending from said head into said hole, said hoses being respectively secured to the shank of said fittings.

18. A drive assembly for a retractable top of a mobile trailer having a pair of front corner telescopic standards and a pair of rear corner telescopic standards supporting said top, said drive assembly comprising an actuator structure, a first pair of flexible connector elements between said actuator structure and said front corner standards, a second pair of flexible connector elements between said actuator structure and said rear corner standards, guide conduits surrounding each of said flexible elements between said actuator structure and said standards, said actuator structure including means providing a first pair of elongated tubes respectively slidably receiving an end portion of one of said first pair of connector elements and a second pair of elongated tubes respectively slidably receiving an end portion of one of said second pair of connector elements, first piston means extending between said first pair of tubes and attached to said end portions of said first pair of connector elements, second piston means extending between said second pair of tubes and attached to said end portions of said second pair of connector elements, slot means in said first and second pairs of tubes providing clearance for said piston means, and a common actuator element connected to both of said piston means.

19. A drive assembly as defined in claim 18, which includes a fitting at each corner respectively in alignment with said standards, each of said fittings comprising a tubular shank extending into a hole through a member of the trailer, an enlarged head at one end of said shank for engaging one side of said member, and flexible finger means adapted to be snapped into engagement with an opposite side of said member for securing the fitting to the member.

20. A drive assembly as defined in claim 18, wherein said tubes comprise four separate discreet tubes.

21. A drive assembly as defined in claim 18, wherein said tubes are a part of a one-piece extruded tube member.

22. A drive assembly as defined in claim 21, wherein said common actuator element comprises a cable having first and second runs respectively connected to said first and second piston means.

23. A drive assembly as defined in claim 22, wherein the tubes of said pairs of tubes are respectively disposed at opposite sides of said runs of the cable.

24. A drive assembly as defined in claim 21, wherein said extruded member includes spaced part inner and outer walls at opposite sides thereof defining spaces therebetween, said actuator structure further including first and second end caps respectively covering opposite ends of said extruded member, each of said caps comprising an end wall, a pair of outwardly projecting tubular nipples through which said connector elements extend and inwardly projecting flexible finger means respectively extending into said spaces for securing the end caps to the extruded member.

25. A drive assembly as defined in claim 24, wherein said guide conduits surrounding said connector elements comprise flexible hoses, said hoses and said tube means being dimensioned for confining said connector elements sufficient to prevent buckling of the connector elements.

\* \* \* \* \*